United States Patent
Kato (10) Patent No.: US 9,731,701 B2
(45) Date of Patent: Aug. 15, 2017

(54) HYBRID VEHICLE AND METHOD OF CONTROLLING THE SAME

(71) Applicant: TOYOTA JIDOSHA KABUSHIKI KAISHA, Toyota-shi, Aichi-ken (JP)

(72) Inventor: Shunya Kato, Seto (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 112 days.

(21) Appl. No.: 14/919,006

(22) Filed: Oct. 21, 2015

(65) Prior Publication Data

US 2016/0114785 A1    Apr. 28, 2016

(30) Foreign Application Priority Data

Oct. 28, 2014 (JP) ................. 2014-219248

(51) Int. Cl.
| | | |
|---|---|---|
| *B60W 20/00* | (2016.01) | |
| *B60W 10/06* | (2006.01) | |
| *B60W 10/08* | (2006.01) | |
| *B60W 10/26* | (2006.01) | |
| *B60K 6/445* | (2007.10) | |
| *B60W 30/18* | (2012.01) | |
| *B60W 20/40* | (2016.01) | |
| *B60W 20/15* | (2016.01) | |

(52) U.S. Cl.
CPC ............ *B60W 10/26* (2013.01); *B60K 6/445* (2013.01); *B60W 10/06* (2013.01); *B60W 10/08* (2013.01); *B60W 20/15* (2016.01); *B60W 20/40* (2013.01); *B60W 30/18036* (2013.01); *B60W 2510/244* (2013.01); *B60W 2710/0666* (2013.01); *B60W 2710/083* (2013.01); *Y02T 10/6239* (2013.01); *Y02T 10/6286* (2013.01); *Y02T 10/7077* (2013.01); *Y10S 903/93* (2013.01)

(58) Field of Classification Search
CPC ....... B60K 6/445; B60W 10/06; B60W 10/08; B60W 10/26; B60W 20/15; B60W 20/40; B60W 30/18036; B60W 2510/244; B60W 2710/0666; B60W 2710/083; Y02T 10/6239; Y02T 10/6286; Y02T 10/7077; Y10S 903/93

See application file for complete search history.

(56) References Cited

U.S. PATENT DOCUMENTS

| | | | |
|---|---|---|---|
| 2004/0235613 A1* | 11/2004 | Aoki | ................. B60L 15/20 477/3 |
| 2007/0243970 A1 | 10/2007 | Amano et al. | |

FOREIGN PATENT DOCUMENTS

| | | |
|---|---|---|
| JP | 2006-57617 | 3/2006 |
| JP | 2012-240557 | 12/2012 |

* cited by examiner

*Primary Examiner* — Khoi Tran
*Assistant Examiner* — Robert Nguyen
(74) *Attorney, Agent, or Firm* — Finnegan, Henderson, Farabow, Garrett & Dunner, LLP (57) ABSTRACT

A maximum output line during HV backward running accompanying actuation of an engine is on a side of lower torque than a maximum output line in EV backward running in an engine stop state. Reverse drive torque during EV backward running is set in accordance with the sum of base torque suppressed within a range not higher than maximum output torque during HV backward running and correction torque added at the time when a reverse drive torque request from a driver is great in accordance with a running state.

7 Claims, 10 Drawing Sheets

|      | C1 | C2 | C3 | B1 | B2 |
|------|----|----|----|----|----|
| 1st  | ○  |    |    |    | ○  |
| 2nd  | ○  |    |    | ○  |    |
| 3rd  | ○  | ○  |    |    |    |
| 4th  |    | ○  |    | ○  |    |
| N    |    |    |    |    |    |

○ : ENGAGED

HYBRID VEHICLE AND METHOD OF CONTROLLING THE SAME

This nonprovisional application is based on Japanese Patent Application No. 2014-219248 filed with the Japan Patent Office on Oct. 28, 2014, the entire contents of which are hereby incorporated by reference.

BACKGROUND OF THE INVENTION

Field of the Invention

This invention relates to a hybrid vehicle and more particularly to control of driving force in backward running in a hybrid vehicle configured such that torque in a forward direction of a vehicle is applied to a driveshaft in response to actuation of an internal combustion engine during backward running.

Description of the Background Art

A powertrain configured such that torque in a forward direction of a vehicle is applied to a driveshaft while an internal combustion engine is actuated is disclosed as one form of a hybrid vehicle. Japanese Patent Laying-Open No. 2006-057617 describes control during backward running accompanying actuation of the internal combustion engine for charging a battery for ensuring driving force in a backward direction in accordance with requested torque by outputting torque necessary for driving a driveshaft to rotate in a reverse direction (a backward direction of a vehicle) from a motor with forward rotation torque (in a forward direction of the vehicle) involved with actuation of the internal combustion engine being canceled.

Japanese Patent Laying-Open No. 2012-240557 discloses a configuration of a powertrain further incorporating an automatic transmission into the configuration the same as in Japanese Patent Laying-Open No. 2006-057617.

SUMMARY OF THE INVENTION

In a hybrid vehicle, an engine may be started from a stop state due to lowering in state of charge (SOC) of a battery during backward running. Here, stepwise lowering in reverse rotation torque of a driveshaft, that is, drive torque in backward running, due to application of forward rotation torque owing to actuation of the engine is concerned. With such variation in torque, comfortableness in driving of a vehicle lowers.

When drive torque during backward movement is uniformly suppressed to be low with highest priority being placed on avoidance of torque level difference above, sufficient torque cannot be ensured, and in particular due to lowering in state of charge (SOC), it becomes difficult to sufficiently ensure a backward travel distance during a period until actuation of the engine. When such a phenomenon occurs as well, comfortableness in driving lowers.

This invention was made to solve such problems, and an object of this invention is to appropriately set driving force during backward running so as to ensure comfortableness in driving, in a hybrid vehicle configured such that torque in a forward direction of a vehicle is applied to a driveshaft in response to actuation of an internal combustion engine during backward running.

According to one aspect of this invention, a hybrid vehicle includes an internal combustion engine, a motor, a driveshaft, a motive power transmission mechanism for transmitting output from the internal combustion engine and the motor to the driveshaft, and a control device. The motor outputs positive rotation torque or negative rotation torque. The driveshaft rotates in a positive direction during forward movement of a vehicle, whereas it rotates in a negative direction during backward movement of the vehicle. The control device is configured to select first backward running in a stop state of the internal combustion engine and second backward running accompanying actuation of the internal combustion engine and to control reverse drive torque during backward running with output from the motor. The control device sets the reverse drive torque in accordance with a sum of base torque set within a range common to the first backward running and the second backward running and correction torque temporarily added in accordance with a running state during the first backward running. The base torque is set within a range not higher than maximum torque which can be applied to the driveshaft during the second backward running.

According to the hybrid vehicle above, even when the internal combustion engine is actuated during first backward running (EV backward running) and transition to second backward running (HV backward running) is made, reverse drive torque (first backward running) immediately before transition is equal to or lower than maximum torque in second backward running immediately after transition. Consequently, since output from the motor can be adjusted such that comparable reverse drive torque is ensured also after start of second backward running, stepwise lowering in reverse drive torque in response to actuation of the internal combustion engine can be prevented. In addition, since reverse drive torque can be increased by adding correction torque in accordance with a running state during first backward running, priority can be placed on avoidance of occurrence of torque level difference during a normal operation as well as on ensured sufficient reverse drive torque at the time when a running state in which a reverse drive torque request from a driver is great is sensed and ensured travel distance in EV backward running during a period until SOC lowers. Thus, comfortableness in driving during backward running can be ensured.

Therefore, a primary advantage of this invention is that driving force during backward running can appropriately be set such that ensured comfortableness in driving and ensured travel distance are both achieved in a hybrid vehicle configured such that torque in a forward direction of a vehicle is applied to a driveshaft in response to actuation of an internal combustion engine during backward running.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described hereinafter in detail with reference to the drawings. The same or corresponding elements in the drawings have the same reference characters allotted and description thereof will not be repeated in principle.

(Overall Configuration of Hybrid vehicle)

Figure 1:
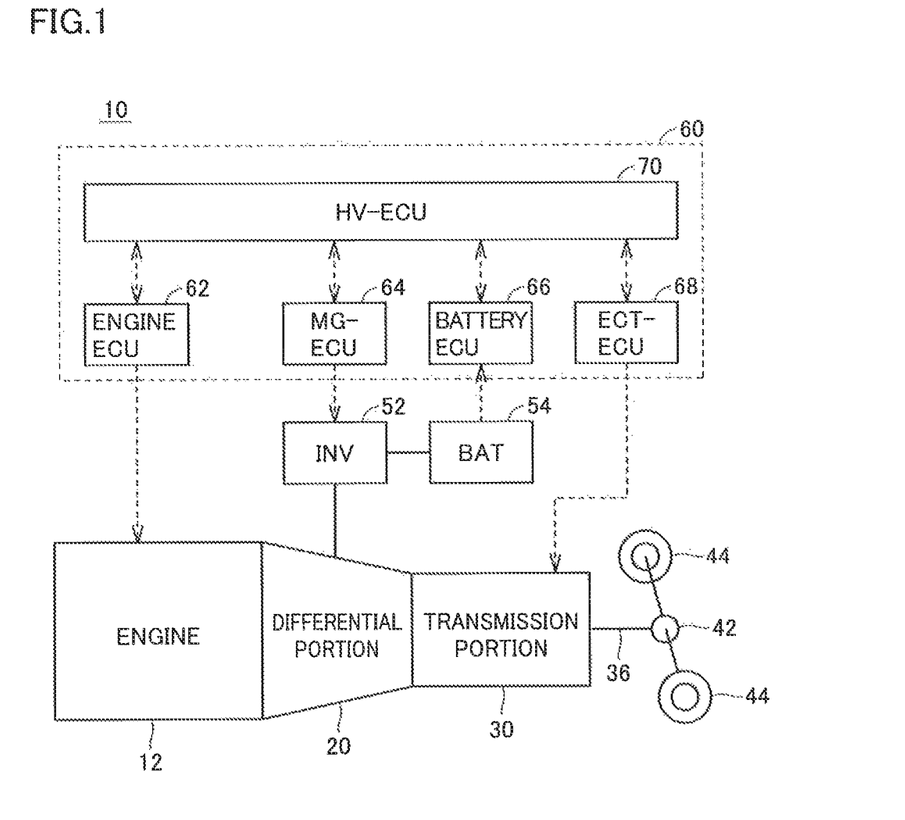
FIG. 1 is a diagram showing an overall configuration of a hybrid vehicle according to an embodiment of the present invention.

FIG. 1 is a diagram showing an overall configuration of a hybrid vehicle 10 according to an embodiment of the present invention. Referring to FIG. 1, hybrid vehicle 10 includes an engine 12, a differential portion 20, a transmission portion 30, a differential gear 42, and a drive wheel 44. Hybrid vehicle 10 further includes an inverter 52, an electric power storage device 54, and a control device 60.

Engine 12 is an internal combustion engine and implemented, for example, by a gasoline engine or a diesel engine. Engine 12 converts thermal energy resulting from combustion of a fuel into kinetic energy of such a motion element as a piston or a rotor and outputs resultant kinetic energy to differential portion 20. For example, kinetic energy from a rotation shaft of engine 12 is transmitted to differential portion 20.

Differential portion 20 is coupled to engine 12. Differential portion 20 includes a motor generator driven by inverter 52 and a power split device as will be described later. The power split device is configured to divide output from engine 12 into output to a transmission member to transmission portion 30 and output to the motor generator. A configuration of differential portion 20 will be described later.

Transmission portion 30 is coupled to differential portion 20 and configured to be able to change a ratio (a gear ratio) between the number of rotations of the transmission member (an input shaft of transmission portion 30) connected to differential portion 20 and the number of rotations of a driveshaft 36 connected to differential gear 42. Driveshaft 36 corresponds to an output shaft of transmission portion 30. In this embodiment, though transmission portion 30 is implemented by a gear type transmission of which gear ratio can be changed in a stepwise manner, it may be implemented by a continuously variable transmission. Differential gear 42 is coupled to the output shaft of transmission portion 30 and transmits motive power output from transmission portion 30 to drive wheel 44. A configuration of transmission portion 30 will also be described later, together with differential portion 20.

Inverter 52 is electrically connected to electric power storage device 54, and drives the motor generator included in differential portion 20 based on a control signal from control device 60. Inverter 52 is implemented, for example, by a bridge circuit including power semiconductor switching elements of three phases. Though not particularly shown, a voltage converter may be provided between inverter 52 and electric power storage device 54.

Electric power storage device 54 is a rechargeable direct-current power supply, and it is implemented representatively by such a battery as a lithium ion battery or a nickel metal hydride battery. Electric power storage device 54 stores electric power including electric power for running and supplies stored electric power to inverter 52. Electric power storage device 54 is charged also by receiving electric power generated by the motor generator in differential portion 20 from inverter 52. Electric power storage device 54 may be implemented by an electric power storage element other than a battery, such as an electric double layer capacitor.

Control device 60 includes an engine electronic control unit (ECU) 62, an MG-ECU 64, a battery ECU 66, an ECT-ECU 68, and an HV-ECU 70. Each of these ECUs includes a central processing unit (CPU), a storage device, and an input and output buffer (none of which is shown), and carries out various types of control which will be described later. Control carried out by each ECU is not limited to processing by software but can also be processed by dedicated hardware (en electronic circuit). Though control device 60 is configured with ECUs above in the present embodiment, control device 60 may be configured with a single ECU.

Engine ECU 62 generates a throttle signal, an ignition signal, or a fuel injection signal for driving engine 12 based on an engine torque instruction received from HV-ECU 70 and outputs each generated signal to engine 12, MG-ECU 64 generates a control signal for controlling inverter 52 based on an instruction from HV-ECU 70, and outputs the generated control signal to inverter 52.

Battery ECU 66 estimates a charged state of electric power storage device 54 (also referred to as state of charge (SOC) and expressed as 0% to 100% with a fully charged state being defined as 100%) based on a voltage and a current of electric power storage device 54 detected by a voltage sensor and a current sensor which are not shown, and outputs a result of estimation to HV-ECU 70. ECT-ECU 68 generates a hydraulic instruction for controlling transmission portion 30 based on a torque capacity instruction received from HV-ECU 70 and outputs the generated hydraulic instruction to transmission portion 30.

HV-ECU 70 receives detection signals from various sensors and generates various instructions for controlling each device of hybrid vehicle 10. As one of main controls carried out by HV-ECU 70, HV-ECU 70 controls running of hybrid vehicle 10 so as to combine "EV running" in which a vehicle runs with only a motor generator being used as a motive power source while engine 12 remains stopped and "HV running" in which a vehicle runs with engine 12 being operated, in accordance with a running state of a vehicle (for example, an amount of operation of an accelerator pedal or a vehicle speed).

For example, HV-ECU 70 selects EV running with engine 12 being stopped in a region in which vehicle running power which varies in accordance with a running state is low (low-speed and low-load running), whereas it selects HV running with engine 12 being actuated in a region in which vehicle running power is high (accelerated high-speed running). When SOC of electric power storage device 54 lowers, in order to generate electric power for charging electric power storage device 54, engine 12 is automatically actuated. Thus, in hybrid vehicle 10, stop of engine 12 in an actuated state and start of engine 12 in a stop state on the contrary are automatically repeated during operation of the vehicle. Namely, engine 12 is intermittently operated in accordance with a running state.

In hybrid vehicle 10, a shift position is selected in response to an operation by a driver onto a not-shown shift lever. The shift position includes a drive (D) position for forward running, a reverse (R) position for backward running, and a parking (P) position for parking. When the D position is selected, hybrid vehicle 10 runs forward by selecting a drive (D) range. On the other hand, when the R position is selected, hybrid vehicle 10 runs backward by selecting a reverse (R) range. In each of forward running and backward running, EV running and HV running are automatically selected in accordance with a state of the vehicle or a running state.

Figure 2:
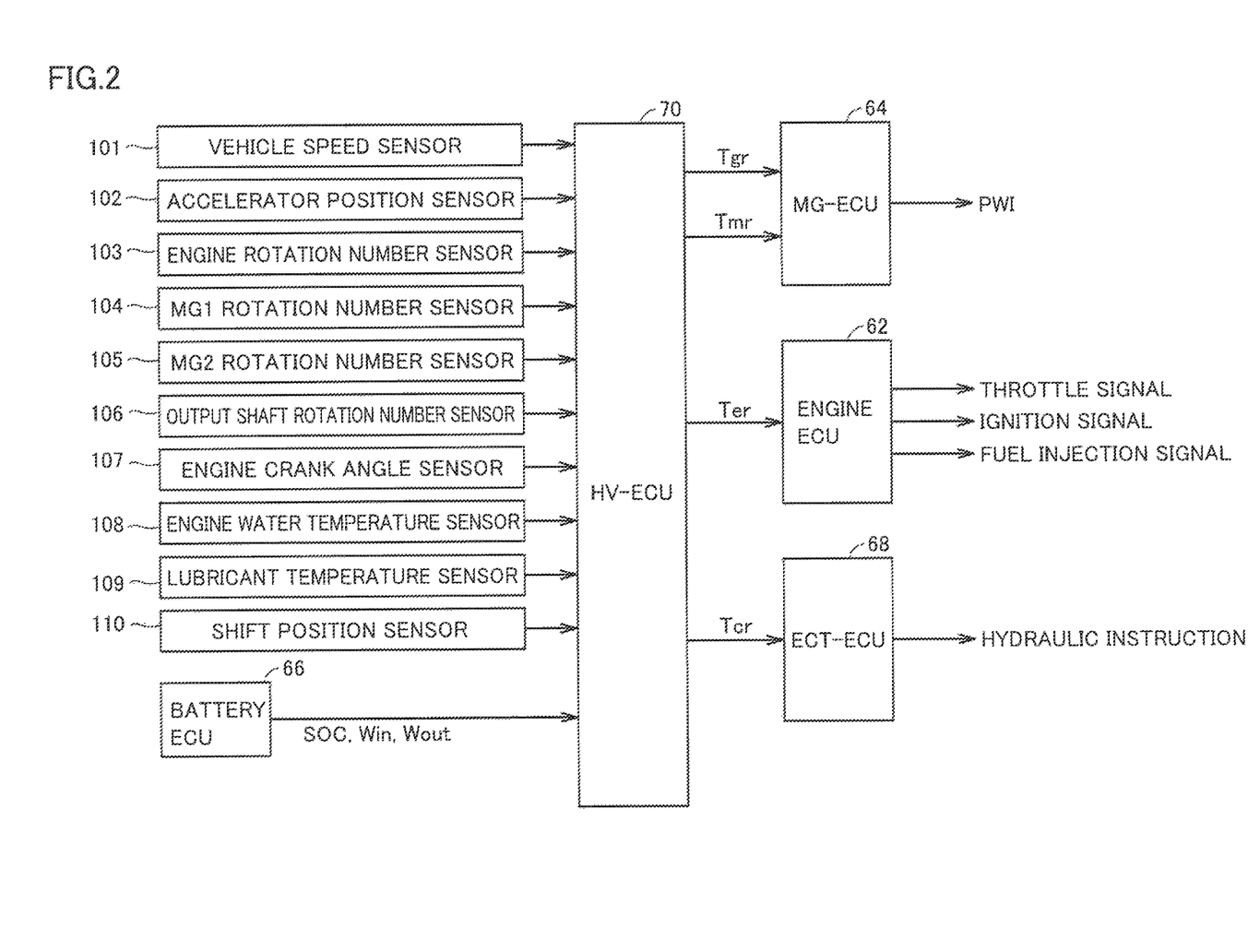
FIG. 2 is a block diagram showing main signals and instructions input to and output from a control device shown in FIG. 1.

FIG. 2 is a diagram showing main signals and instructions input to and output from control device 60 shown in FIG. 1. Referring to FIG. 2, HV-ECU 70 receives a signal from a vehicle speed sensor 101 detecting a speed of hybrid vehicle 10, a signal from an accelerator position sensor 102 detecting an amount of operation of an accelerator pedal, and a signal from an engine rotation number sensor 103 detecting the number of rotations of engine 12. HV-ECU 70 further receives a signal from an MG1 rotation number sensor 104 for detecting the number of rotations of a motor generator MG1 (which will be described later) included in differential portion 20, a signal from an MG2 rotation number sensor 105 for detecting the number of rotations of a motor generator MG2 (which will be described later) included in differential portion 20, and a signal from an output shaft rotation number sensor 106 for detecting the number of rotations of the output shaft of transmission portion 30.

HV-ECU 70 further receives a signal from a lubricant temperature sensor 109 detecting a temperature of a lubricant for differential portion 20 and transmission portion 30, a signal from a shift position sensor 110 detecting a shift position indicated by a shift lever, a signal from a water temperature sensor 108 detecting a temperature of an engine coolant, and a signal from an engine crank angle sensor 107 detecting an angle of rotation of an engine output shaft (a crankshaft). Selection of a shift position described above is made based on a signal from shift position sensor 110.

HV-ECU 70 further receives a signal indicating SOC of electric power storage device 54, a signal indicating chargeable electric power Win indicating the upper limit of electric power for charging electric power storage device 54, and a signal indicating dischargeable electric power Wout indicating the upper limit of electric power discharged from electric power storage device 54, from battery ECU 66. Battery ECU 66 restricts discharge electric power when SOC of electric power storage device 54 is low or when a temperature is low or high. Similarly, when SOC is high or when a temperature is low or high, in order to restrict charging electric power, chargeable electric power Win from electric power storage device 54 is suppressed.

HV-ECU 70 controls allocation of output among engine 12 and motor generators MG1 and MG2 in consideration of energy efficiency of a vehicle under control of running in accordance with a running state of the vehicle (for example, an amount of operation of an accelerator pedal or a vehicle speed). An intermittent operation of engine 12 described above is performed in accordance with this control of allocation of output. Specifically, allocation of output in response to requested power in the vehicle as a whole, which includes drive torque for generating drive torque in accordance with running control and output power from engine 12 for generating electric power for charging electric power storage device 54 for SOC control, is controlled.

HV-ECU 70 generates an engine torque instruction Ter indicating a target for output torque of engine 12, torque instructions Tgr and Tmr for driving motor generators MG1 and MG2 of differential portion 20, and a torque capacity instruction Tcr for controlling transmission portion 30 in accordance with running control (control of allocation of output). For example, HV-ECU 70 determines a gear position of transmission portion 30 in accordance with a prescribed shift map and generates torque capacity instruction Tcr for implementing the gear position.

Engine ECU 62 which has received engine torque instruction Ter generates a throttle signal, an ignition signal, or a fuel injection signal for driving engine 12 and outputs the signal to engine 12. While engine 12 remains stopped, a condition of Ter=0 is set so that fuel injection and ignition in engine 12 are stopped and combustion of fuel can be stopped.

MG-ECU 64 which has received torque instructions Tgr and Tmr generates a signal PW1 for controlling inverter 52 such that motor generators MG1 and MG2 generate torque corresponding to torque instructions Tgr and Tmr, and outputs generated signal PW1 to inverter 52.

ECT-ECU 68 which has received torque capacity instruction Tcr generates a hydraulic instruction such that transmission portion 30 has a torque capacity corresponding to torque capacity instruction Tcr and outputs the generated hydraulic instruction to transmission portion 30.

(Configuration of Differential Portion and Transmission Portion)

Figure 3:
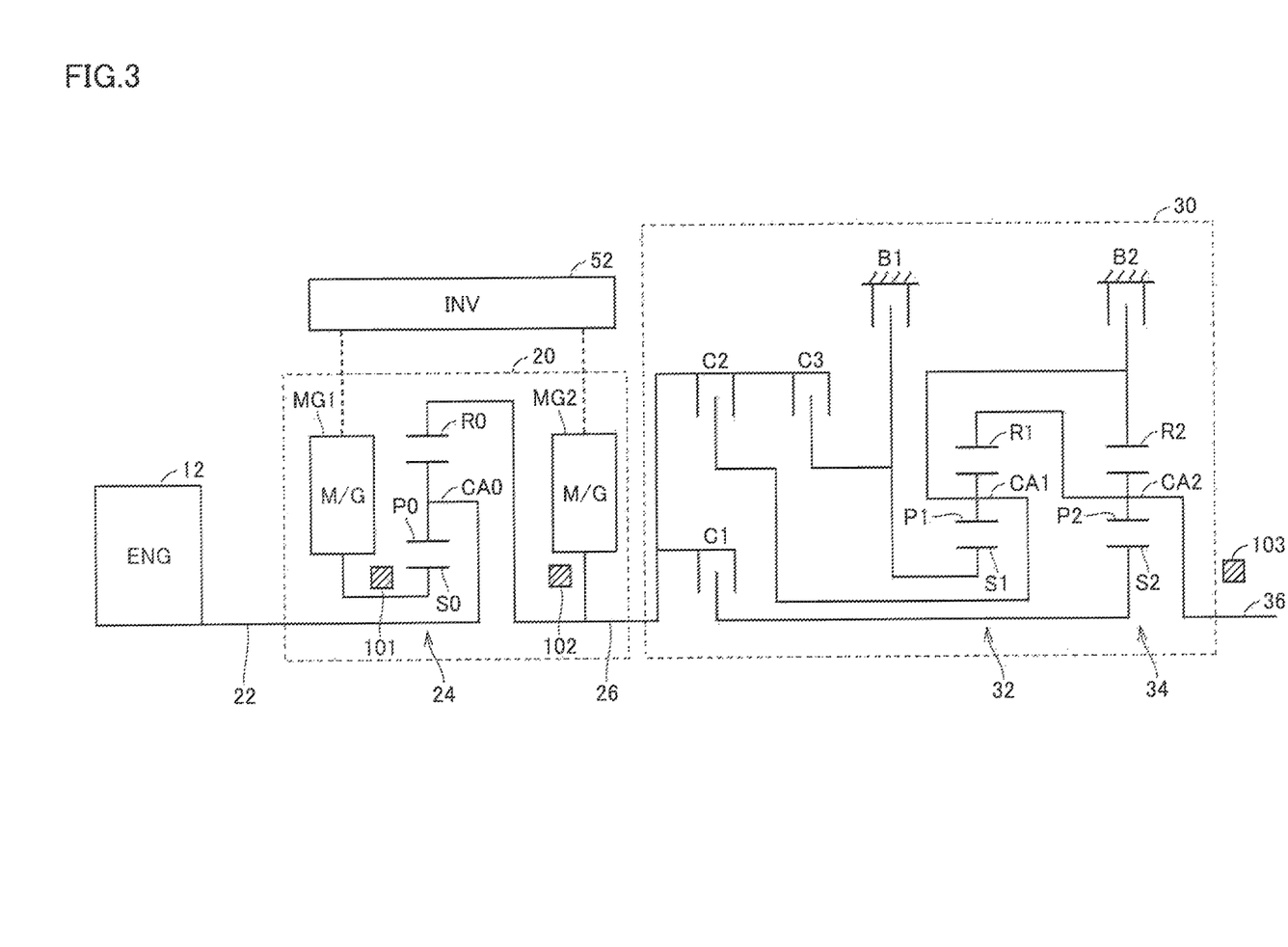
FIG. 3 is a diagram showing a configuration of a differential portion and a transmission portion shown in FIG. 1.

FIG. 3 is a diagram showing a configuration of the differential portion and the transmission portion shown in FIG. 1.

Since differential portion 20 and transmission portion 30 are configured in symmetry with respect to an axis center thereof in the present embodiment, FIG. 3 illustrates differential portion 20 and transmission 30 portion with a lower portion thereof being omitted.

Referring to FIG. 3, differential portion 20 includes motor generators MG1 and MG2 and a power split device 24. Each of motor generators MG1 and MG2 is an alternating-current motor, and it is implemented, for example, by a permanent magnet type synchronous motor including a rotor having a permanent magnet embedded. Motor generators MG1 and MG2 are driven by inverter 52.

Power split device 24 is implemented by a single pinion type planetary gear, and includes a sun gear S0, a pinion gear P0, a carrier CA0, and a ring gear R0. Carrier CA0 is coupled to an input shaft 22, that is, the output shaft of engine 12, and supports pinion gear P0 in a rotatable and revolvable manner. Sun gear S0 is coupled to a rotation shaft of motor generator MG1. Ring gear R0 is coupled to a transmission member 26 and constructed to mesh with sun gear S0 with pinion gear P0 being interposed. A rotation shaft of motor generator MG2 is coupled to transmission member 26. Namely, ring gear R0 is coupled also to the rotation shaft of motor generator MG2.

Figure 5:
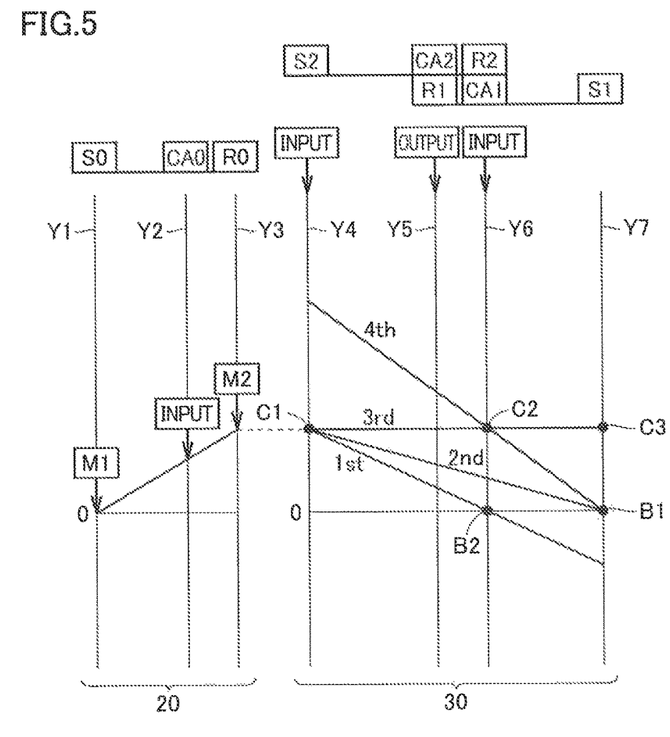
FIG. 5 is a nomographic chart of a transmission mechanism constituted of the differential portion and the transmission portion.

Power split device 24 functions as a differential device as sun gear S0, carrier CA0, and ring gear R0 rotate relative to one another. The number of rotations of each of sun gear S0, carrier CA0, and ring gear RD satisfies relation as being connected by a straight line in a nomographic chart which will be described later (FIG. 5). With a differential function of power split device 24, motive power output from engine 12 is distributed to sun gear S0 and ring gear R0. With motive power distributed to sun gear S0, motor generator MG1 is actuated as a generator, and electric power generated by motor generator MG1 is supplied to motor generator MG2 or stored in electric power storage device 54 (FIG. 1).

With output torque from motor generator MG1, rotational force for acceleration and deceleration can be provided to the output shaft of engine 12. Therefore, in starting engine 12 in the stop state, engine 12 is controlled such that after the number of rotations of the engine increases as motor generator MG1 provides cranking torque to engine 12, fuel injection and ignition in engine 12 (that is, combustion of fuel) are started.

Transmission portion 30 includes single pinion type planetary gears 32 and 34, clutches C1 to C3, and brakes B1 and B2. Planetary gear 32 includes a sun gear S1, a pinion gear P1, a carrier CA1, and a ring gear R1. Planetary gear 34 includes a sun gear S2, a pinion gear P2, a carrier CA2, and a ring gear R2.

Each of clutches C1 to C3 and brakes B1 and B2 is a hydraulically actuated friction engagement device, and it is of a wet multi-plate type in which a plurality of layered friction plates are pressed by a hydraulic pressure or is made by a band brake in which one end of a band wound around an outer circumferential surface of a rotating drum is tightened by a hydraulic pressure.

Figure 4:
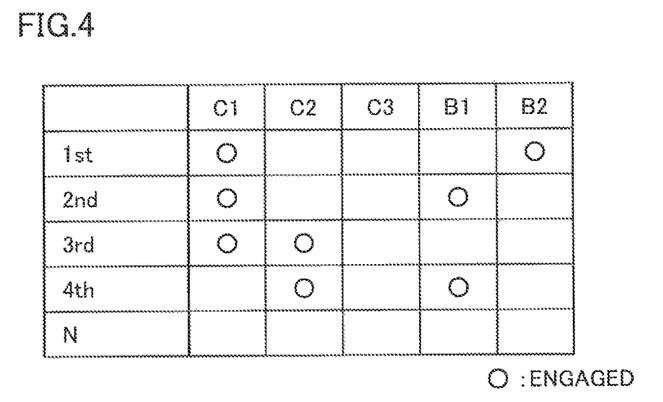
FIG. 4 is a diagram showing an engagement actuation table of the transmission portion shown in FIG. 3.

In this transmission portion 30, each engagement device of clutches C1 to C3 and brakes B1 and B2 is engaged in accordance with an engagement actuation table shown in FIG. 4, so that any one of a first gear to a fourth gear is formed. In FIG. 4, a circle indicates an engaged state and a blank field indicates a released state. By setting each engagement device of clutches C1 to C3 and brakes B1 an B2 to a released state as illustrated, a neutral state (a state in which motive power transmission is cut off) can be formed.

Referring again to FIG. 3, differential portion 20 and transmission portion 30 are coupled to each other through transmission member 26. Then, driveshaft 36 corresponding to the output shaft of transmission portion 30, which is coupled to carrier CA2 of planetary gear 34, is coupled to drive wheels 44 with differential gear 42 being interposed. Driveshaft 36 and drive wheels 44 match with each other in direction of rotation. Driveshaft 36 and drive wheels 44 rotate in a positive direction during forward running, while they rotate in reverse in a negative direction during backward running.

FIG. 5 is a nomographic chart of a transmission mechanism constituted of differential portion 20 and transmission portion 30. Referring to FIG. 3 together with FIG. 5, a vertical line Y1 in the nomographic chart corresponding to differential portion 20 shows the number of rotations of sun gear S0 of power split device 24, that is, the number of rotations of motor generator NM1. A vertical line Y2 shows the number of rotations of carrier CA0 of power split device 24, that is, the number of rotations of engine 12. A vertical line Y3 shows the number of rotations of ring gear R0 of power split device 24, that is, the number of rotations of motor generator MG2. An interval among vertical lines Y1 to Y3 is determined in accordance with a gear ratio of power split device 24.

A vertical line Y4 in the nomographic chart corresponding to transmission portion 30 shows the number of rotations of sun gear S2 of planetary gear 34, and a vertical line Y5 shows the number of rotations of carrier CA2, of planetary gear 34 and ring gear R1 of planetary gear 32 which are coupled to each other. A vertical line Y6 represents the number of rotations of ring gear R2 of planetary gear 34 and carrier CA1 of planetary gear 32 which are coupled to each other, and a vertical line Y7 shows the number of rotations of sun gear S1 of planetary gear 32. An interval among vertical lines Y4 to Y7 is determined in accordance with a gear ratio of planetary gears 32 and 34.

As clutch C1 is engaged, sun gear S2 of planetary gear 34 is coupled to ring gear R0 of differential portion 20, and sun gear S2 rotates at the same speed as ring gear R0. As clutch C2 is engaged, carrier CM of planetary gear 32 and ring gear R2 of planetary gear 34 are coupled to ring gear R0, and carrier CA1 and ring gear R2 rotate at the same speed as ring gear R0. As clutch C3 is engaged, sun gear S1 of planetary gear 32 is coupled to ring gear R0, and sun gear S1 rotates at the same speed as ring gear R0. As brake B1 is engaged, rotation of sun gear S1 is stopped, and as brake B2 is engaged, rotation of carrier CA1 and ring gear R2 is stopped.

For example, as shown in the engagement actuation table in FIG. 4, when clutch C1 and brake B1 are engaged and other clutches and brake are released, the nomographic chart of transmission portion 30 is linear as shown with "2nd". Vertical line Y5 representing the number of rotations of carrier CA2 of planetary gear 34 shows the number of output rotations of transmission portion 30 (the number of rotations of driveshaft 36). Thus, by engaging or releasing clutches C1 to C3 and brakes B1 and B2 in transmission portion 30 in accordance with the engagement actuation table in FIG. 4, the first gear to the fourth gear and a neutral state can be formed. Thus, in hybrid vehicle 10, transmission portion 30 is arranged in the motive power transmission path from the output shaft of engine 12 to driveshaft 36. Namely, in the configuration example in FIG. 1, output from engine 12 and motor generators MG1 and MG2 is transmitted to driveshaft 36 by differential portion 20 and transmission portion 30.

Figure 6:
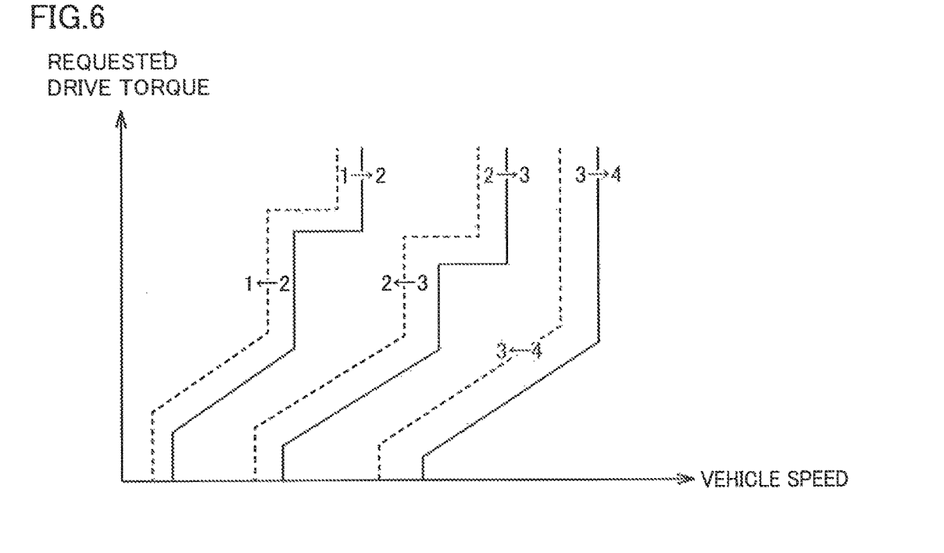
FIG. 6 is a diagram showing one example of a shift map for controlling automatic shift change by the transmission portion shown in FIG. 3.

Automatic shift change by transmission portion 30 is controlled, for example, based on a shift map shown in FIG. 6.

Referring to FIG. 6, the abscissa represents a vehicle speed and the ordinate represents requested drive torque of hybrid vehicle 10 calculated based on an accelerator opening and a vehicle speed. A parameter determining shift change is not limited thereto. In FIG. 6, a solid line represents an upshift line and a dotted line represents a downshift line.

In hybrid vehicle 10 according to the present embodiment, a common gear (the first gear to the fourth gear) is shared between forward running (the D range) and backward running (the R range). Namely, the gear is switched among the first gear to the fourth gear also during backward running. A shift map can be set independently for each of forward running (the D range) and backward running (the R range).

(Backward Running Control)

In hybrid vehicle 10 according to the present embodiment, drive torque for backward running (hereinafter also referred to as "reverse drive torque") is output as motor generator MG2 rotates in the negative direction (reverse rotation). Therefore, it is understood that performance in backward running is dependent on setting of reverse drive torque. On the other hand, also during backward running, switching between EV running and HV running is made by controlling stop and actuation of engine 12. Backward running with engine 12 being stopped is hereinafter also referred to as "EV backward running." Similarly, backward running with engine 12 being actuated is also referred to as "HV backward running." EV backward running corresponds to "first backward running" and HV backward running corresponds to "second backward running."

Figure 7:
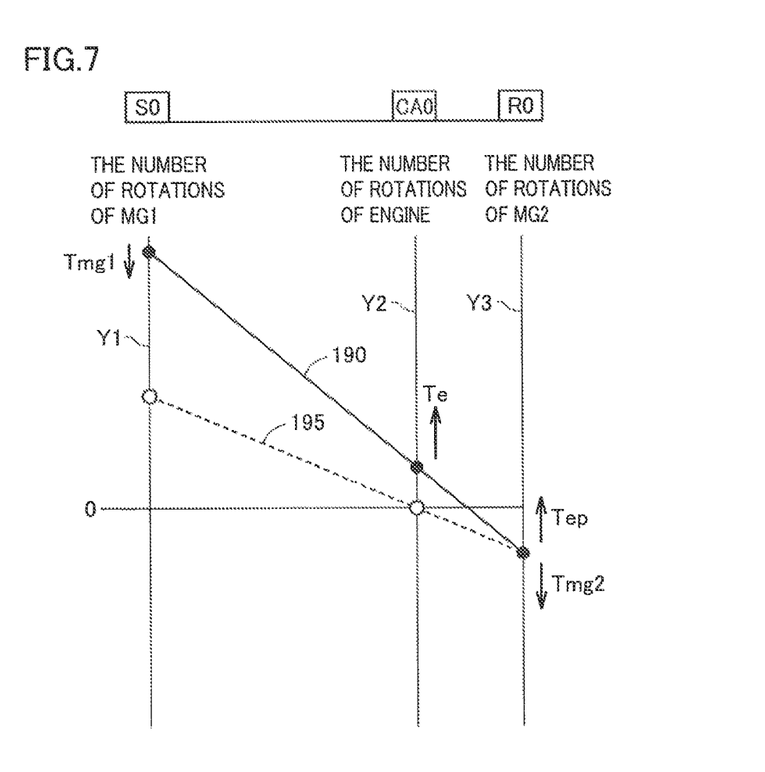
FIG. 7 is a nomographic chart of the differential portion during backward running.

FIG. 7 shows a nomographic chart in differential portion 20 during backward running.

Referring to FIG. 7, vertical lines Y1, Y2, and Y3 represent the numbers of rotations of motor generator MG1, engine 12, and motor generator MG2 as in FIG. 5, respectively.

In EV backward running, as shown in a nomographic chart 195 (a dotted line), a vehicle runs backward as motor generator MG2 outputs negative torque applied in a direction of reverse rotation of driveshaft 36. Reverse drive torque of hybrid vehicle 10 in EV backward running is in proportion to torque Tmg2 of motor generator MG2. Specifically, with a gear ratio (a deceleration ratio) between the number of rotations of ring gear R0 and transmission member 26 (that is, the number of rotations of MG2) and the number of rotations of driveshaft 36, that is, a gear ratio (a deceleration ratio) of transmission portion 30 being defined as k, reverse drive torque Trv is shown as Trv=−Tmg2·k (Tmg2<0). Reverse drive torque Trv is represented with torque in a backward direction being expressed as a positive value.

During backward running as well, when SOC of electric power storage device 54 lowers, HV running in which engine 12 is actuated is applied in order to recover SOC through electric power generation owing to actuation of engine 12. HV backward running follows a nomographic chart 190 shown with the solid line.

In HV backward running, engine 12 is controlled to output power for generating electric power for charging electric power storage device 54. In general, while the engine is actuated for electric power generation, an operation point (torque×the number of rotations) at which efficiency of engine 12 is high is selected. As motor generator MG1 outputs negative torque (Tmg1<0) in response to output from engine 12, electric power is generated. Generated electric power is converted by inverter 52 into electric power for charging electric power storage device 54. Thus, electric power storage device 54 can be charged with output from engine 12 during backward running.

In HV backward running, directly-transmitted engine torque Tep in accordance with output torque Tmg1 from motor generator MG1 (Tep=−Tmg1/ρ (ρ: a gear ratio) is transmitted to ring gear R0 and transmission member 26. Directly-transmitted engine torque Tep corresponds to torque output to ring gear R0 (transmission member 26) when engine 12 is operated at the target number of rotations and target torque while motor generator MG1 absorbs reaction force from engine 12.

During backward running, since a condition of Tmg1<0 is satisfied, directly-transmitted engine torque Tep is applied to ring gear R0 and transmission member 26 as torque in a direction of forward rotation, that is, in a forward direction of the vehicle. Therefore, since reverse drive torque Trv decreases by |Tep| from |Tmg2|, torque in the backward direction decreases as compared with that when engine 12 is stopped.

Figure 8:
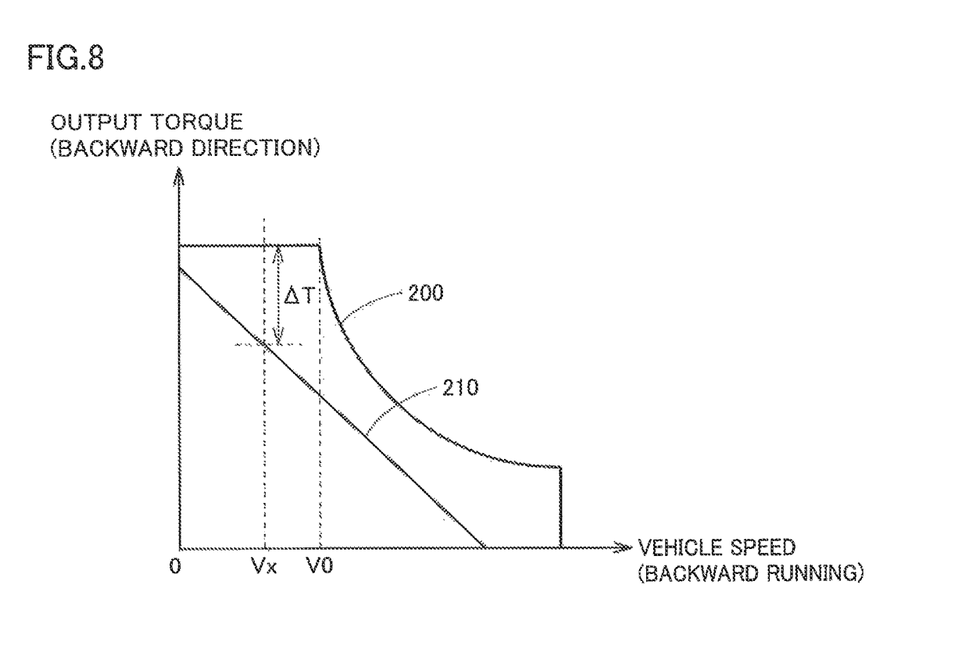
FIG. 8 is a conceptual diagram for illustrating maximum output torque from the differential portion during backward running.

FIG. 8 is a conceptual diagram for illustrating maximum output torque from differential portion 20 during backward running. The abscissa in FIG. 8 represents a vehicle speed in a backward direction and the ordinate represents output torque from differential portion 20 to transmission member 26 with the backward direction being defined as a positive direction.

Referring to FIG. 8, a maximum output line 200 corresponds to a set of maximum values of output torque from differential portion 20 at each vehicle speed during EV backward running. In contrast, a maximum output line 210 corresponds to a set of maximum values of output torque from differential portion 20 at each vehicle speed during HV backward running.

Since only torque from motor generator MG2 is applied to transmission member 26 in EV backward running, maximum output line 200 corresponds to the maximum output line of motor generator MG2.

In contrast, in HV backward running, as described with reference to FIG. 7, as directly-transmitted engine torque Tep is applied in the forward direction of the vehicle, maximum output torque at each vehicle speed decreases as compared with that during EV running. Namely, a torque difference ΔT between maximum output lines 200 and 210 at each vehicle speed is dependent on directly-transmitted engine torque Tep applied in the positive direction (the direction of forward running) as the engine is actuated. Namely, it can be understood that this torque difference ΔT varies depending on a vehicle speed Vx.

While the R range has been selected, hybrid vehicle 10 basically selects EV backward running, because directly-transmitted engine torque Tep generated as a result of actuation of engine 12 is applied in a direction interfering backward running as above.

When SOC of electric power storage device 54 lowers, however, HV backward running should be applied with engine 12 for charging electric power storage device 54 being actuated. For example, when EV backward running is carried out for a long period of time at relatively high output such as in climbing running in backward movement, transition from EV backward running to HV backward running is required in accordance with lowering in SOC due to torque output by motor generator MG2.

As shown in FIG. 8, there is a difference in maximum output torque between EV backward running and HV backward running. Therefore, when switching from EV backward running to HV backward running is made while hybrid vehicle 10 runs at an operation point at torque higher than maximum output line 210, stepwise lowering in output torque from differential portion 20 due to lowering in maximum output torque in response to occurrence of directly-transmitted engine torque Tep is concerned.

When such torque level difference is caused, lowering in comfortableness in driving due to uncomfortable feeling being given to a driver is concerned. On the other hand, when driving force in backward movement is uniformly suppressed to be low with highest priority being placed on avoidance of torque level difference, sufficient drive torque cannot be ensured, and in particular, a backward travel distance during a period until the engine is actuated due to lowering in SOC cannot be ensured. Comfortableness in driving lowers also when such a phenomenon occurs.

Therefore, in the hybrid vehicle according to the present embodiment, an attempt to ensure comfortableness in driving in backward running is made by setting reverse drive torque under backward running control as will be described below.

Figure 9:
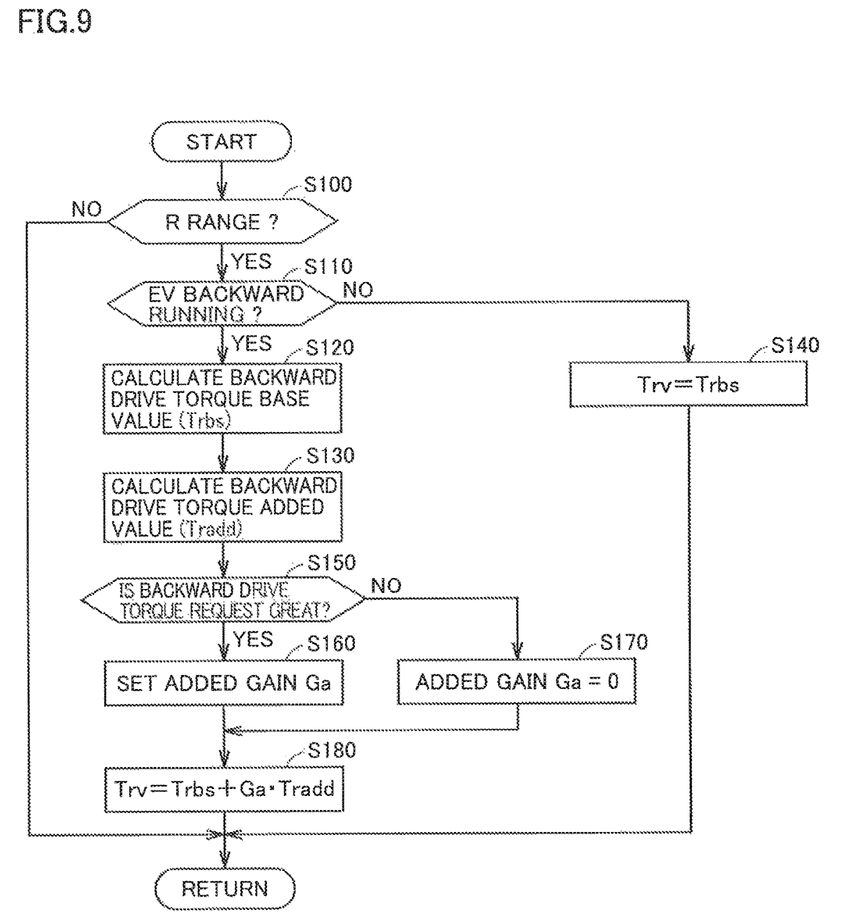
FIG. 9 is a flowchart illustrating control processing for setting reverse drive torque in the hybrid vehicle according to the present embodiment.

FIG. 9 is a flowchart illustrating control processing for setting reverse drive torque in the hybrid vehicle according to the present embodiment. Control processing in accordance with the flowchart shown in FIG. 9 is repeatedly performed by HV-ECU 70.

HV-ECU 70 determines in step S100 whether or not the R range for backward running has been selected. When the R range has not been selected (determination as NO is made in S100), setting of drive torque for backward running in step S110 or later is not made.

When the R range has been selected (determination as YES is made in S100), the process proceeds to step S110 and HV-ECU 70 determines whether or not EV backward running in which engine 12 remains stopped is carried out. In EV backward running (determination as YES is made in S110), HV-ECU 70 calculates in step S120, base torque Trbs representing a base value for reverse drive torque.

Figure 10:
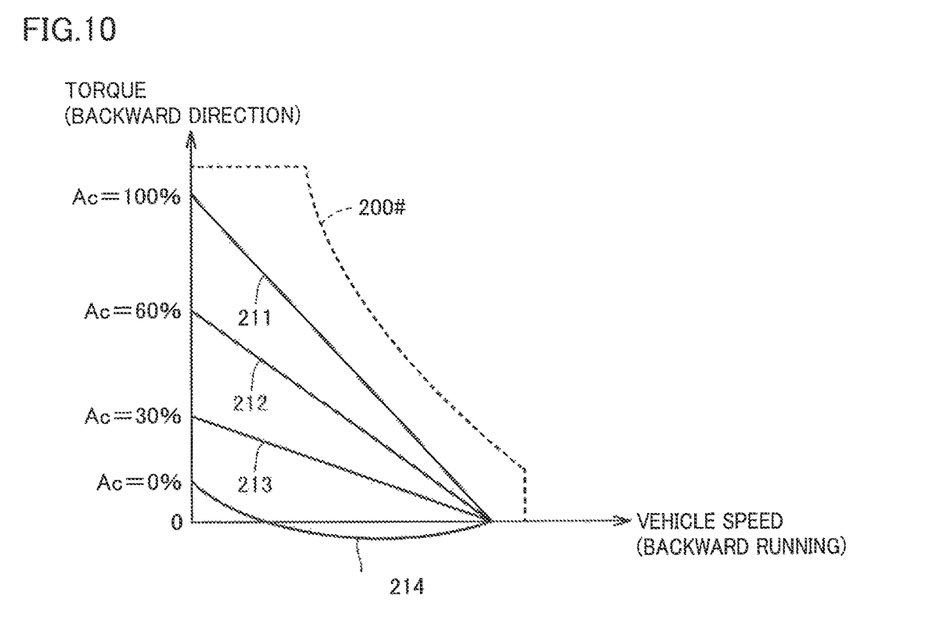
FIG. 10 is a conceptual diagram illustrating a map for calculating base torque during backward running.

FIG. 10 is a conceptual diagram illustrating a map for calculating base torque during backward running. The abscissa in FIG. 10 represents a vehicle speed in the backward direction and the ordinate represents drive torque in the backward direction.

Referring to FIG. 10, as shown with characteristic lines 211 to 214, base torque Trbs is set in accordance with accelerator opening Ac and a vehicle speed (backward running). Accelerator opening Ac is represented by a percentage with a fully opened state being defined as 100%, based on a signal from accelerator position sensor 102. Base torque Trbs is also represented with torque in the backward direction being expressed as a positive value. A vehicle speed is sensed based on a signal from vehicle speed sensor 101.

Characteristic lines 211 to 214 show base torque Trbs at vehicle speeds at Ac=100%, 60%, 30%, and 0%, respectively. Base torque Trbs can be set by linear interpolation between two characteristic lines at an accelerator opening corresponding to an intermediate state of each characteristic line. Thus, a map for calculating base torque Trbs in correspondence with accelerator opening Ac and a vehicle speed (the backward direction) in accordance with characteristic lines 211 to 214 can be set in advance.

In FIG. 10, a maximum torque characteristic line 200# indicating a maximum value for reverse drive torque during EV backward running is shown with a dotted line. Maximum torque characteristic line 200# corresponds to a set of reverse drive torque at each vehicle speed at the time when output from differential portion 20 is set in accordance with maximum output line 200 shown in FIG. 8.

On the other hand, characteristic line 211 at Ac=100%, that is, at the maximum output, corresponds to a set of reverse drive torque at each vehicle speed at the time when output from differential portion 20 is set in accordance with maximum output line 210 during HV backward running shown in FIG. 8. Therefore, base torque Trbs is set within a range not higher than a maximum value of reverse drive torque which can be output during HV backward running.

Referring again to FIG. 9, HV-ECU 70 further calculates in step S130 an added value Tradd for reverse drive torque (hereinafter also referred to as added torque Tradd).

Figure 11:
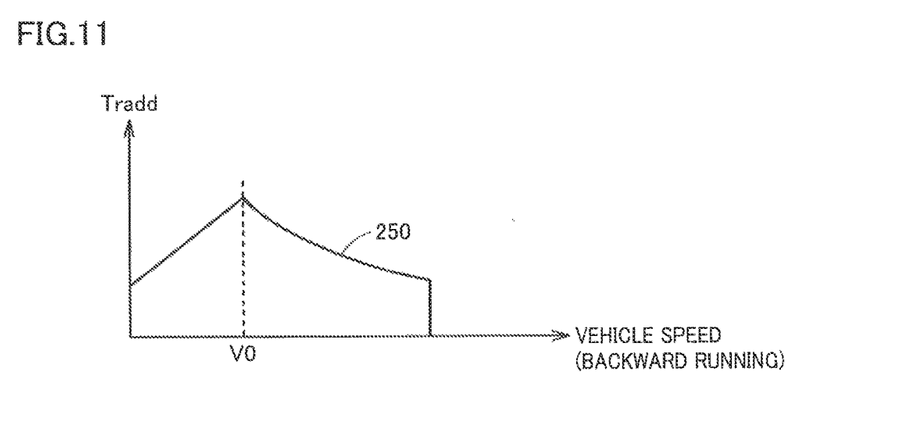
FIG. 11 is a conceptual diagram illustrating a map for calculating added torque during backward running.

FIG. 11 is a conceptual diagram for illustrating a map for setting added torque. The abscissa in FIG. 11 represents a vehicle speed in the backward direction and the ordinate represents a set value for added torque Tradd. Added torque Tradd is shown also with torque in the backward direction being expressed as a positive value.

Referring to FIG. 11, added torque Tradd is set in accordance with a vehicle speed (in the backward direction) in accordance with a characteristic line 250. Added torque Tradd at each vehicle speed can be set in accordance with torque difference ΔT between maximum output lines 200 and 210 from differential portion 20 shown in FIG. 8. Namely, added torque Tradd takes a maximum value at a vehicle speed V0 in FIG. 8. A map for calculating added torque Tradd in correspondence with a vehicle speed (in the backward direction) in accordance with characteristic line 250 can be set in advance.

Referring again to FIG. 9, HV-ECU 70 determines in step S150 whether or not a running state in which a reverse drive torque request from a driver is great has been set. For example, when accelerator opening Ac is greater than a prescribed criterion value Ac*, determination as YES is made in step S150.

Alternatively, a running state in which a reverse drive torque request from a driver is great may be sensed during climbing running in backward running based on an output from a not-shown gradient sensor. For example, when a value detected by the gradient sensor is greater than a criterion value while the R range has been selected, determination as YES can be made in step S150.

Alternatively, a running state in which a reverse drive torque request from a driver is great may be sensed at the time of riding over a step during backward running. For example, when a state in which accelerator opening Ac is greater than a prescribed value and a vehicle speed is zero has continued for a certain period of time while the range has been selected, determination as YES can be made in step S150.

When a running state in which a reverse drive torque request from a driver is great is not sensed (determination as NO is made in S150), HV-ECU 70 sets an added gain Ga=0 in step S170. On the other hand, when a running state in which a reverse drive torque request from a driver is great is sensed (determination as YES is made in S150), HV-ECU 70 sets added gain Ga in step S160. For example, a condition of Ga=1.0 can be set.

HV-ECU 70 sets in step S180, reverse drive torque Trv in accordance with an expression (1), based on added gain Ga (8160 and S170), base torque Trbs (S120), and added torque Tradd (S130).

$$Trv = Trbs + Ga \cdot Tradd \qquad (1)$$

Therefore, during EV backward running, when a running state in which a reverse drive torque request from a driver is great is sensed, correction torque ΔTrv in accordance with a product of added torque Tradd and added gain Ga (ΔTrv=Tradd·Ga) is added to base torque Trbs.

On the other hand, during HV backward running (determination as NO is made in S110), HV-ECU 70 sets in step S140, reverse drive torque Trv comparable to base torque Trbs in step S120. Namely, a condition of Trv=Trbs is set also in HV backward running as in EV backward running.

As torque Tmg2 of motor generator MG2 is controlled in accordance with reverse drive torque Trv set in step S140 or S180, hybrid vehicle 10 can run backward with driving force in accordance with reverse drive torque Trv in any of HV running and EV running.

According to the hybrid vehicle in the present embodiment, also during EV backward running, reverse drive torque is set as being suppressed within the range not higher than maximum torque which can be output during HV backward running. Thus, when engine 12 is actuated during EV backward running and transition to HV backward running is made, reverse drive torque immediately before the transition (during EV backward running) is not higher than maximum torque in HV backward running immediately after transition. Consequently, since motor generator MG2 can be adjusted such that comparable reverse drive torque is ensured also after start of HV backward running, stepwise lowering in reverse drive torque in response to actuation of engine 12 can be prevented.

In particular, as in the example in FIG. 9, by setting base torque Trbs common to HV backward running and EV backward running, the occurrence of torque level difference at the time of actuation of engine 12 during EV backward running and transition to HV backward running can more reliably be prevented.

Furthermore, in EV backward running, when a running state in which a reverse drive torque request from a driver is great is sensed, reverse drive torque can be increased by adding correction torque. Thus, occurrence of torque level difference during a normal operation can be avoided, and priority can be placed on ensuring reverse drive torque sufficient in accordance with a running state or on ensuring a travel distance in EV backward running during a period until SOC lowers. Thus, comfortableness in driving during backward running can be ensured.

(Modification of Correction Torque)

A more preferred example for setting correction torque ΔTrv characterizing the present embodiment will now further be described as a modification.

Figure 12:
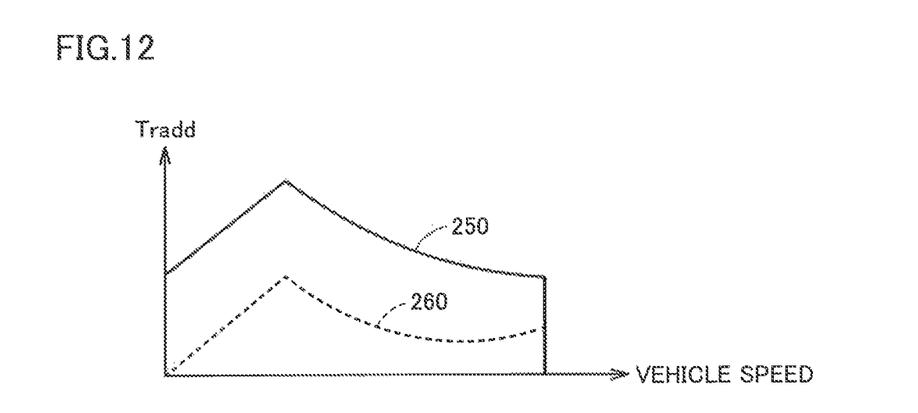
FIG. 12 is a conceptual diagram illustrating a map for setting added torque in accordance with a gear ratio of the transmission portion.

FIG. 12 shows a conceptual diagram illustrating a map for setting added torque Tradd in accordance with a gear ratio of transmission portion 30.

Referring to FIG. 12, when transmission portion 30 has selected a gear (a Lo gear) at which a gear ratio (a deceleration ratio) is high for a low speed, added torque Tradd at each vehicle speed is set in accordance with characteristic line 250 shown in FIG. 11. The Lo gear corresponds to the first gear or the second gear.

In contrast, a characteristic line 260 corresponds to a set of set values for added torque Tradd at each vehicle speed while transmission portion 30 has selected a gear (a Hi gear) at which a gear ratio (a deceleration ratio) is low for a high speed. A Hi gear corresponds, for example, to the third gear and the fourth gear. Added torque Tradd set in accordance with characteristic line 260 is smaller than added torque Tradd set in accordance with characteristic line 250 at the same vehicle speed.

While the Lo gear (the gear ratio being high) has been selected, normally, torque greater than that while the Hi gear (the gear ratio being low) has been selected is requested. In particular, in the configuration exemplified in FIG. 3, the deceleration ratio is low while the Hi gear (the gear ratio being low) has been selected. Therefore, even though MG2 torque is increased, an amount of increase in reverse drive torque of hybrid vehicle 10 cannot be ensured that much.

Therefore, it is understood that in terms of ensured vehicle driving force and energy efficiency, preferably, great added torque Tradd is ensured while the Lo gear is selected whereas added torque Tradd is decreased while the Hi gear is selected.

Therefore, in calculating added torque Tradd in step S130 in FIG. 9, a plurality of maps for calculating added torque Tradd in correspondence with a vehicle speed (in the backward direction) in accordance with characteristic lines 250 and 260 can be set in advance such that one is selected in accordance with a gear ratio of transmission portion 30. Thus, for the same vehicle speed, correction torque ΔTrv can be set such that reverse drive torque Trv is greater when a gear ratio of transmission portion 30 is high, than that when the gear ratio is low.

Instead of switching between maps for setting added torque Tradd, correction torque ΔTrv can similarly be adjusted also by variably setting added gain Ga (S160) in accordance with a gear ratio (a gear) of transmission portion 30. When transmission portion 30 is implemented by a continuously variable transmission as well, correction torque ΔTrv can similarly be adjusted by dividing gear ratios into a plurality of regions.

Figure 13:
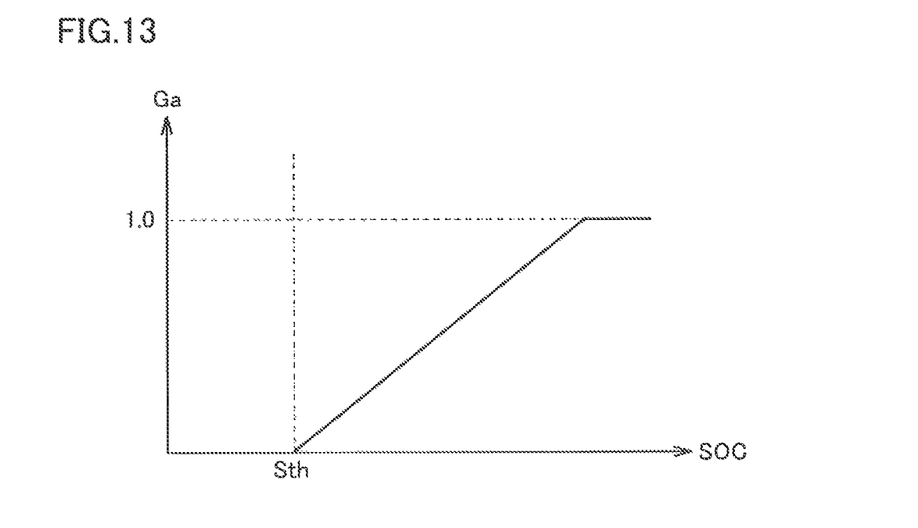
FIG. 13 is a conceptual diagram illustrating a map for setting added gain in accordance with SOC of an electric power storage device.

FIG. 13 is a conceptual diagram for illustrating a map for setting added gain Ga in accordance with SOC of electric power storage device 54.

Referring to FIG. 13, preferably, added gain Ga is variably set in accordance with SOC of electric power storage device 54. For example, a condition of Ga=1.0 is set in a region where SOC is high, Ga is lowered with lowering in SOC, and a condition of Ga=0 can be set in a region where a condition of SOC≤Sth is satisfied. In the region where the condition of Ga=0 is satisfied, correction torque ΔTrv=0 is set.

As described so far, in hybrid vehicle 10, engine 12 is actuated as SOC lowers. Therefore, by determining Sth in correspondence with SOC at which charging by actuation of engine 12 is indicated, correction torque ΔTrv at the timing of actuation of engine 12 can be decreased.

Thus, when SOC is sufficient, correction torque ΔTrv to be added at the time when a running state in which a reverse drive torque request from a driver is great is sensed is set for ensuring drive torque, while correction torque is decreased as SOC lowers. At the time point of switching from EV backward running to HV backward running, a condition of ΔTrv=0 can be set. Consequently, occurrence of torque level difference with actuation of engine 12 can reliably be avoided.

Figure 14:
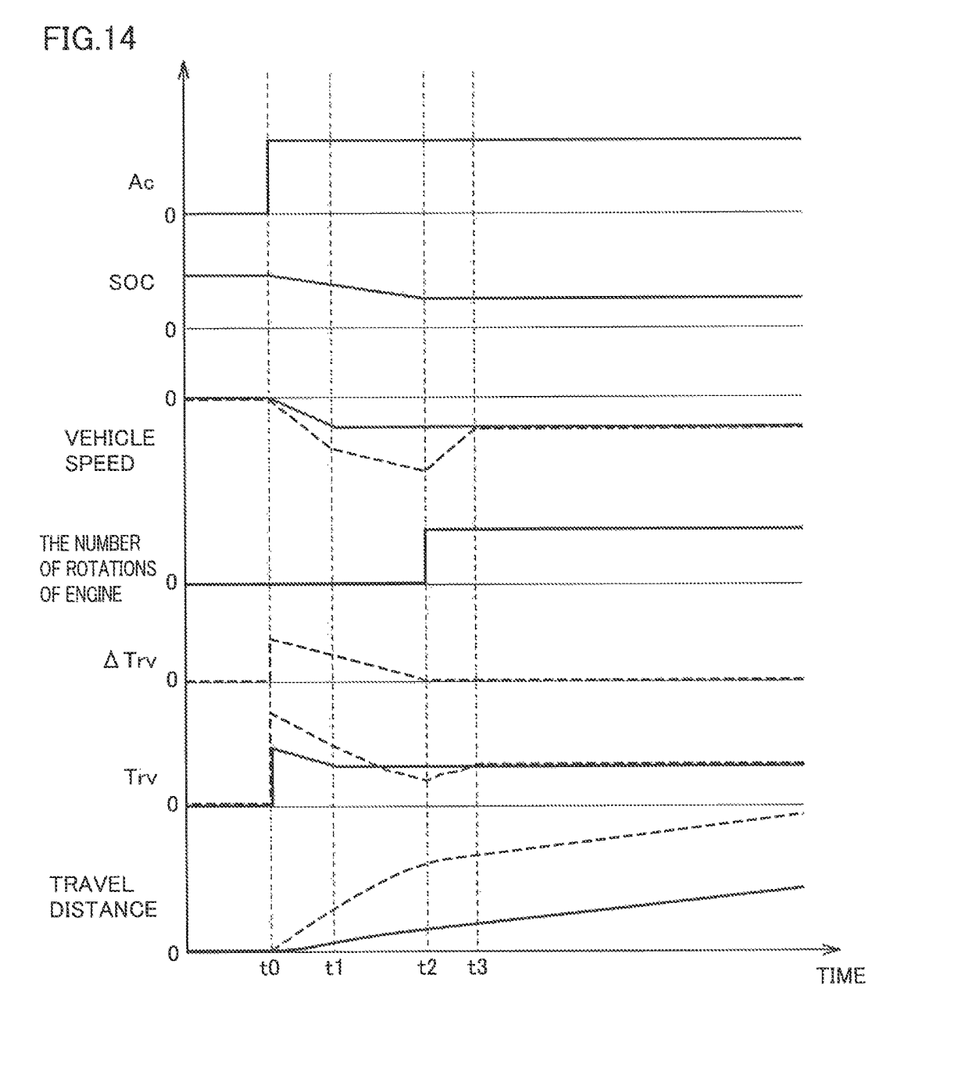
FIG. 14 is a waveform diagram showing an operation example during backward running of the hybrid vehicle according to the present embodiment.

FIG. 14 shows an exemplary operation waveform during backward running of the hybrid vehicle according to the present embodiment. FIG. 14 shows with a solid line, an operation waveform in a case of running only with base torque (Trv=Trbs), and shows with a dotted line, an operation waveform in a case that backward drive torque is set with correction torque ΔTrv being added. Adjustment in accordance with SOC shown in FIG. 13 is incorporated in setting of correction torque ΔTrv.

Referring to FIG. 14, while the R range has been selected, at time t0, accelerator pedal is operated by a driver. Here, it is assumed that accelerator opening Ac at time t0 or later is constant. In addition, it is assumed that, with this accelerator opening, determination as YES is made in S150 in FIG. 9 (AC>Ac*) and a running state in which a reverse drive torque request from the driver is great is sensed.

In backward running shown with the solid line, at time t0 or later, a condition of Trv=Trbs is set. At time t1 or later, reverse drive torque corresponding to a vehicle speed (backward running) at that time point and running resistance balance each other out so that a vehicle speed is constant.

At time t0 or later, SOC gradually lowers with torque output from motor generator MG2, and at time t2, start of charging for SOC recovery is indicated. Engine 12 is actuated in response thereto. At the time of actuation of the engine for charging, an operation point of engine 12 is maintained at prescribed torque and the number of rotations in consideration of efficiency.

Even though engine 12 is actuated at time t2, reverse drive torque Trv does not fluctuate because reverse drive torque during EV backward running is suppressed to base torque Trbs. Namely, occurrence of torque level difference can be avoided. On the other hand, since torque is suppressed to Trv Trbs in backward running shown with the solid line, a vehicle speed does not much increase and a travel distance cannot be ensured either.

In contrast, according to backward running shown with the dotted line in which correction torque has been added according to the present embodiment, a running state in which a reverse drive torque request from a driver is great is sensed and hence reverse drive torque Trv is set with correction torque ΔTrv being added.

Correction torque ΔTrv decreases with lowering in SOC, in accordance with setting of added gain Ga shown in FIG. 13. Then, at time t2 at which engine 12 is started due to lowering in SOC, ΔTrv is set to 0 (ΔTrv=0). With addition of correction torque, an amount of decrease in SOC between times t1 and t2 can be greater than that at the time when the vehicle runs only with base torque (the solid line). It is assumed here, however, that a condition has been adjusted for comparison between a case with addition of correction torque and a case without addition of correction torque, with the timing of actuation of engine 12 being the same.

In HV backward running after time t2, reverse drive torque is set in accordance with base torque Trbs (FIG. 10). Then, reverse drive torque (base torque) corresponding to a vehicle speed and running resistance balance each other out at time t3, so that a vehicle speed in backward running becomes constant.

It is understood based on comparison between operation waveforms shown with the solid line and the dotted line that reverse drive torque and a travel distance in EV backward running in particular during a period until SOC lowers are ensured, owing to backward running with correction torque having been added according to the present embodiment. In particular, it is understood that, when correction torque is added, in spite of slight shortening of a period until actuation of engine 12 due to lowering in SOC, a travel distance during that period increases. Furthermore, both of reverse drive torque ensured by addition of correction torque and avoidance of torque level difference in response to actuation of engine 12 can further be achieved owing to control (FIG. 13) for gradually decreasing correction torque with lowering in SOC.

For a confirmation purpose, the configuration of the powertrain in the hybrid vehicle is not limited to the example in the present embodiment. In particular, though FIG. 3 exemplifies the configuration as combined with transmission portion 30, motor generator MG2 may be arranged to mechanically be coupled to output shaft 36 (driveshaft) of transmission portion 30. Setting of reverse drive torque according to the present invention is commonly applicable to a hybrid vehicle having a powertrain configuration in which torque in a forward direction of the vehicle is applied also in backward running, to the driveshaft while the internal combustion engine is actuated.

Although an embodiment of the present invention has been described, it should be understood that the embodiment disclosed herein is illustrative and non-restrictive in every respect. The scope of the present invention is defined by the terms of the claims, and is intended to include any modifications within the scope and meaning equivalent to the terms of the claims.

What is claimed is:

1. A hybrid vehicle, comprising:
an internal combustion engine;
a motor configured to output positive rotation torque or negative rotation torque;
a driveshaft configured to rotate in a positive direction during forward movement of a vehicle and to rotate in a negative direction during backward movement of the vehicle;
a motive power transmission mechanism configured to transmit output from said internal combustion engine and said motor to said driveshaft; and
a control device configured to select first backward running in a stop state of said internal combustion engine and second backward running accompanying actuation of said internal combustion engine and to control reverse drive torque during backward running with output from said motor,
said motive power transmission mechanism being configured to apply torque in the positive direction to said driveshaft in response to actuation of said internal combustion engine and apply negative rotation torque from said motor as torque in the negative direction to said driveshaft, during backward running,
said control device setting said reverse drive torque in accordance with a sum of base torque set within a range common to said first backward running and said second backward running and correction torque added in accordance with a running state during said first backward running, and
said base torque being set within a range not higher than maximum torque which can be applied to said driveshaft during said second backward running.

2. The hybrid vehicle according to claim 1, wherein
said motive power transmission mechanism includes a transmission portion arranged in a motive power transmission path from an output shaft of said internal combustion engine to said driveshaft, and
said control device sets, for the same vehicle speed, said correction torque such that said reverse drive torque is higher when a deceleration ratio of said transmission portion is high, than when the deceleration ratio is low.

3. The hybrid vehicle according to claim 1, further comprising:
a generator configured to generate electric power with output from said internal combustion engine; and
an electric power storage device configured to supply and receive electric power to and from said generator and said motor, wherein
said control device selects said second backward running when an amount of charge in said electric power storage device is lower than a criterion value during said backward running and further sets said correction torque such that said reverse drive torque decreases as the amount of charge in said electric power storage device becomes lower and comes close to said criterion value.

4. The hybrid vehicle according to claim 1, wherein
said correction torque is set in accordance with a vehicle speed, in conformity with a difference between maximum torque which can be output to said driveshaft by said motor during said first backward running and maximum torque which can be applied to said driveshaft by said motor with torque involved with actuation of said internal combustion engine during said second backward running having been canceled.

5. The hybrid vehicle according to claim 1, wherein
said correction torque is added when an accelerator opening is greater than a prescribed criterion value.

6. The hybrid vehicle according to claim 1, wherein
said correction torque is added when a vehicle speed is zero regardless of output of reverse drive torque during backward running.

7. The hybrid vehicle according to claim 1, wherein said correction torque is added when climbing running is detected during said backward running.

* * * * *